(12) United States Patent
Yu (10) Patent No.: US 10,919,196 B2
(45) Date of Patent: Feb. 16, 2021

(54) METHOD FOR MAKING A BICYCLE SADDLE

(71) Applicant: VELO ENTERPRISE CO., LTD., Taichung (TW)

(72) Inventor: Tsai-Yun Yu, Taichung (TW)

(73) Assignee: VELO ENTERPRISE CO., LTD., Taichung (TW)

( * ) Notice: Subject to any disclaimer, the term of this patent is extended or adjusted under 35 U.S.C. 154(b) by 265 days.

(21) Appl. No.: 15/857,059

(22) Filed: Dec. 28, 2017

(65) Prior Publication Data

US 2018/0200926 A1    Jul. 19, 2018

(30) Foreign Application Priority Data

Jan. 13, 2017   (TW) .............................. 106101175 A (51) Int. Cl.
| | |
|---|---|
| *B29C 44/06* | (2006.01) |
| *B62J 1/26* | (2006.01) |
| *B29C 44/12* | (2006.01) |
| *B29C 44/08* | (2006.01) |
| *B29C 44/18* | (2006.01) |
| *B29L 31/30* | (2006.01) |
| *B29K 75/00* | (2006.01) |

(Continued)

(52) U.S. Cl.
CPC .............. *B29C 44/06* (2013.01); *B29C 44/08* (2013.01); *B29C 44/086* (2013.01); *B29C 44/1219* (2013.01); *B29C 44/18* (2013.01); *B62J 1/26* (2013.01); *B29C 44/143* (2013.01); *B29K 2075/00* (2013.01); *B29K 2105/04* (2013.01); *B29L 2031/3094* (2013.01); *B60Y 2410/122* (2013.01)

(58) Field of Classification Search
CPC ..... B29C 44/08; B29C 44/083; B29C 44/086; B29C 44/585; B29C 44/06; B29C 44/1219; B29L 2031/3091; B29L 2031/3094

See application file for complete search history.

(56) References Cited

U.S. PATENT DOCUMENTS 3,352,258 A * 11/1967 Lassaulx ................. A47J 43/20
                                                            425/89
3,534,129 A * 10/1970 Gunter ................. B29C 44/086
                                                            264/46.4

(Continued)

*Primary Examiner* — Anthony Calandra
*Assistant Examiner* — Eric T Chen
(74) *Attorney, Agent, or Firm* — Browdy and Neimark, PLLC (57) ABSTRACT

A method for making a bicycle saddle includes the steps of placing a cover onto a mold cavity of a female mold; pouring a pressure-loading layer of a temper Foam material into the mold cavity; placing a first male mold into the mold cavity for defining a first closed portion and maintaining the mold in such closed condition a first period of time for foaming the temper foam material into the pressure-loading layer; removing the first male mold; pouring a supporting layer of an ordinary foam material into the mold cavity; closing the mold cavity by the second male mold with a shell coupled thereon for defining a second closed portion and maintaining the mold in such closed condition a second period of time for foaming the ordinary foam material into the supporting layer, and removing the second male mold to extract a finished bicycle saddle.

6 Claims, 6 Drawing Sheets

(51) Int. Cl.
*B29C 44/14* (2006.01)
*B29K 105/04* (2006.01)

(56) References Cited

U.S. PATENT DOCUMENTS

| | | | | |
|---|---|---|---|---|
| 4,999,068 A | * | 3/1991 | Chiarella | B62J 1/18 |
| | | | | 156/145 |
| 5,441,676 A | | 8/1995 | Bigolin | |
| 2008/0122267 A1 | * | 5/2008 | Larson | A47C 4/52 |
| | | | | 297/4 |

* cited by examiner

METHOD FOR MAKING A BICYCLE SADDLE

BACKGROUND OF THE INVENTION

1. Field of the Invention

The present invention relates to bicycle saddles and particularly relates to a method for making a bicycle saddle.

2. Description of the Related Art

U.S. Pat. No. 5,441,676 disclosed a method for making a bicycle saddle which can improve the riding comfort. The saddle made according to the method includes not only a foam layer disposed between a shell and a covering but a gel layer arranged between the foam layer and the covering. Such a saddle may have the expected riding comfort. However, the drawback of the saddle is that, as shown in FIG. 2 of the issued patent, the intersection of the foam layer and the gel layer is formed with steps so that the rider's crotch and legs cannot make smooth contact with the surface of the saddle. The result is that when riding for a long time, the rider's crotch and legs will experience friction, discomfort, and even injury.

SUMMARY OF THE INVENTION

The present invention is proposed to solve the aforementioned drawbacks of prior art. Accordingly, a method for making a bicycle saddle according one aspect of the present invention comprises the steps of placing a cover onto a mold cavity of a female mold by vacuum suction in a way that the cover has a main area attached to an inner wall of the mold cavity and a circumferential area extending beyond an edge of the mold cavity; pouring a pressure-loading layer of a temper Foam material into the d cavity at a molding temperature being higher than the room temperature; placing a first male mold into the mold cavity for defining a first closed portion between the main area of the cover and the first male mold and maintaining the mold in such closed condition a first period of time for foaming the temper foam material into the pressure-loading layer according to the shape of the first closed portion; removing the first male mold; pouring a supporting layer of an ordinary foam material into the mold cavity; coupling a shell made of a rigid or semi-rigid plastic material to a second male mold; closing the mold cavity by the second male mold for defining a second closed portion between the shell and the pressure-loading layer and maintaining the mold in such closed condition a second period of time for foaming the ordinary foam material into the supporting layer according to the shape of the second closed portion, and removing the second male mold and extracting a finished bicycle saddle.

BRIEF DESCRIPTION OF THE DRAWINGS

The advantages and features of the present invention will appear from the following description when considered in conjunction with the accompanying drawings, in which:

FIGS. 4-a to 4-g schematically illustrate the various steps of the method according to the present invention for producing the bicycle saddle of FIG. 1.

DETAILED DESCRIPTION OF TILE INVENTION

Figure 1:
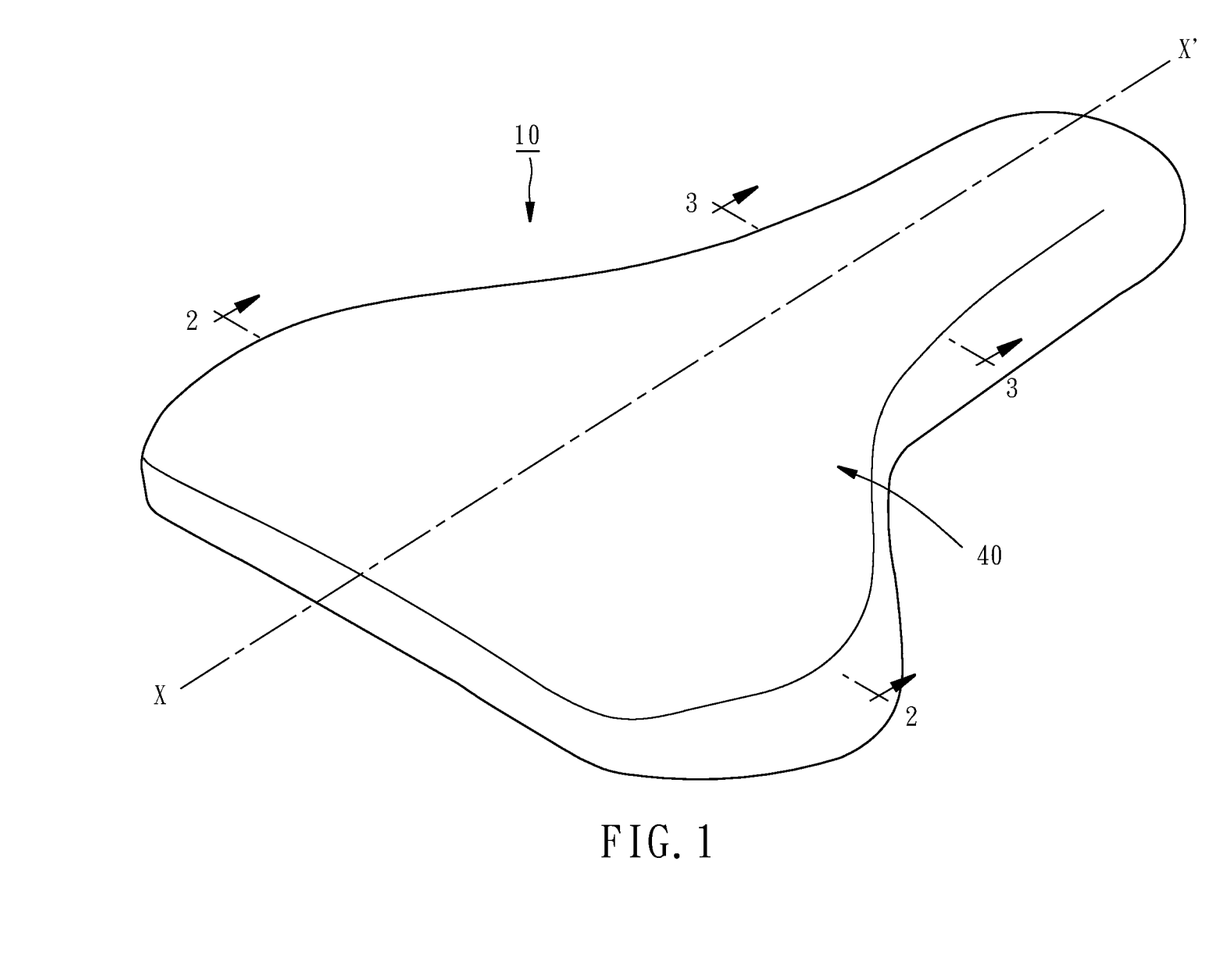
FIG. 1 is a perspective view of a bicycle saddle made according to an embodiment of the present invention.
Figure 2:
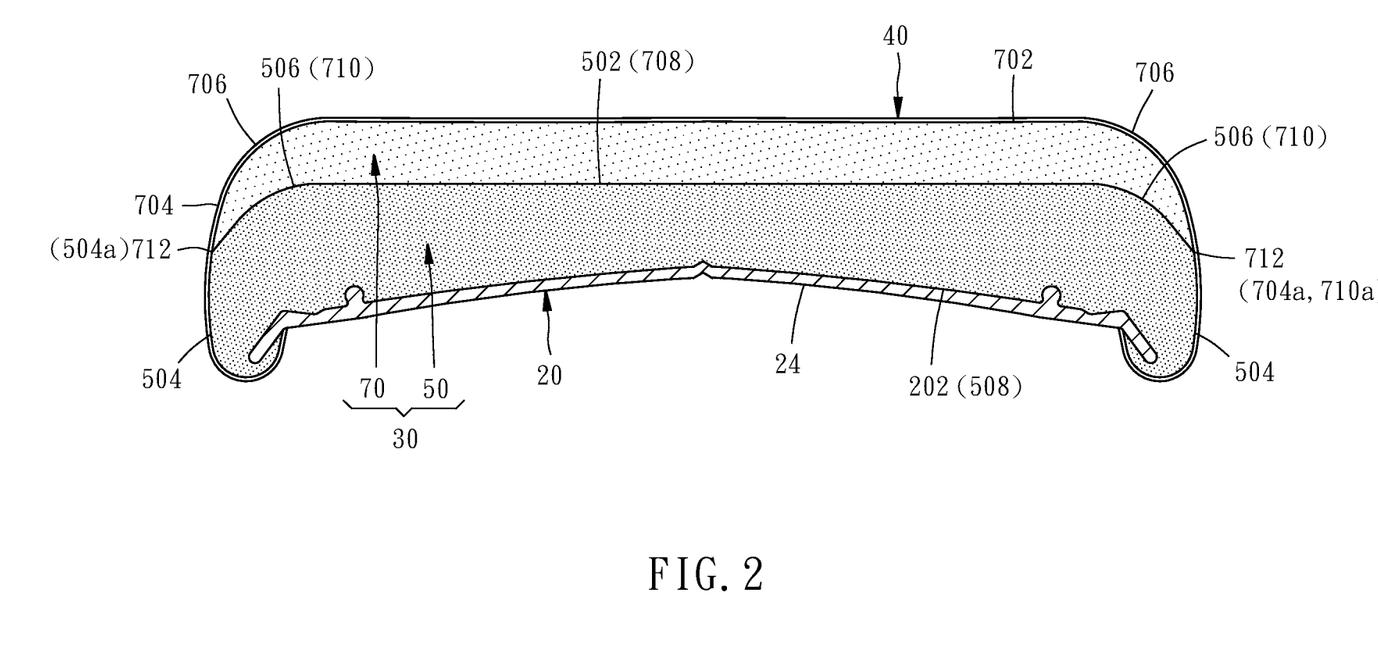
FIG. 2 is a sectional view of the bicycle saddle along line 2-2 in FIG. 1.
Figure 3:
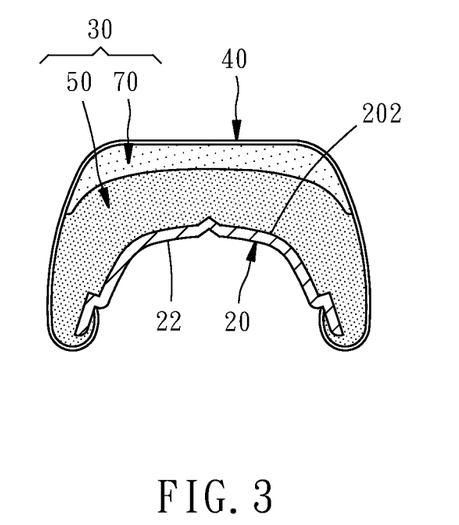
FIG. 3 is a sectional view of the bicycle saddle along line 3-3 in FIG. 1.

Referring firstly to FIG. 1 to FIG. 3, a bicycle saddle produced according to an embodiment of the present invention is generally designated by the reference numeral 10. The bicycle saddle 10 comprises a load-bearing shell 20, a padding 30 disposed on the shell 20, and a cover 40 covering tightly over the padding 30 and thereby providing a seating surface for a bicycle rider to sit on.

The shell 20 has a relatively narrow anterior portion 22, as shown in FIG. 3, which becomes progressively narrower towards its front end. The shell 20 further comprises a relatively wide posterior portion 24 to form the seat, as shown in FIG. 2, and a longitudinal axis X-X' extending from the front end of the narrow anterior portion 22 to the rear end of the wide posterior portion 24.

The padding 30 comprises a supporting layer 50 and a pressure-bearing layer 70. The supporting layer 50 is made of a PU foam material with a high spring-back rate and disposed on an upper surface 202 of the shell 20. The pressure-bearing layer 70 is made of a temper foam material with a slow spring-back rate, which is arranged between the cover 40 and the supporting layer 50.

Preferably, the supporting layer 50 includes a first upper surface 502, a first side surface 504, a first convex arc surface 506 connecting the first upper surface 502 and the first side surface 504, and a first under surface 508 attached onto the upper surface 202 of the shell 20.

The pressure-bearing layer 70 includes a second upper surface 702, a second side surface 704, a second convex arc surface 706 connecting the second upper surface 702 and the second side surface 704, and a second under surface 708 with a second concave arc portion 710. The second upper surface 702, the second side surface 704 and the second convex arc surface 706 is tightly covered by the cover 40. The second under surface 708 is bonded on the upper surface 502 of the supporting layer 50, the second concave arc portion 710 is bonded onto the first convex arc surface 506 of the supporting layer 50.

In addition, the second side surfaces 704 has a first lower end 704a, and the concave arc portion 710 has a second lower end (710a) joining to the first lower end 704a so as to define an outer edge 712. The outer edge 712 is connected with the upper end 504a of the first side surface 504 so that the saddle 10 will have a smooth outer side surface for providing a comfortable contact during riding.

Referring now to FIGS. 4-a to 4-g, an embodied method according to the present invention for making the bicycle saddle 10 is described as follows. For producing the bicycle saddle 10, the method usually uses a set of molds, as shown in FIG. 4-a, including a female mold 80, a first male mold 82, a second male mold 84 and a locking frame 86.

Figure 4A:
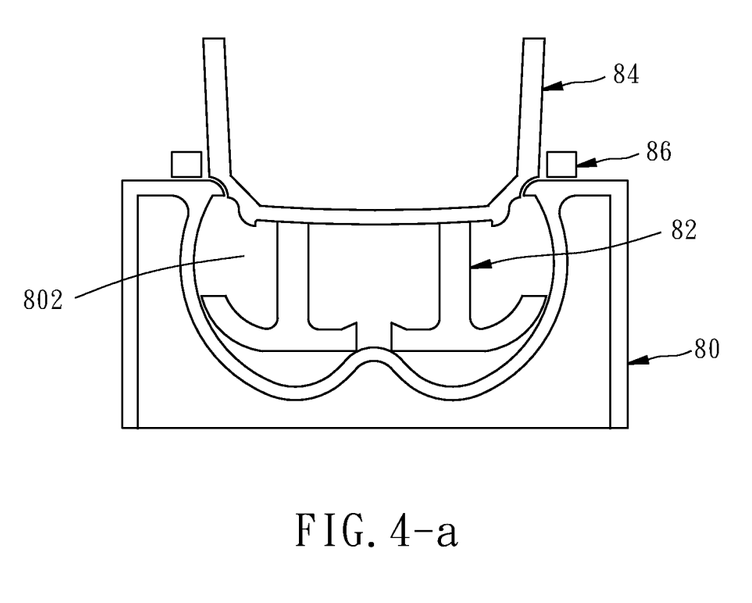
Figure 4B:
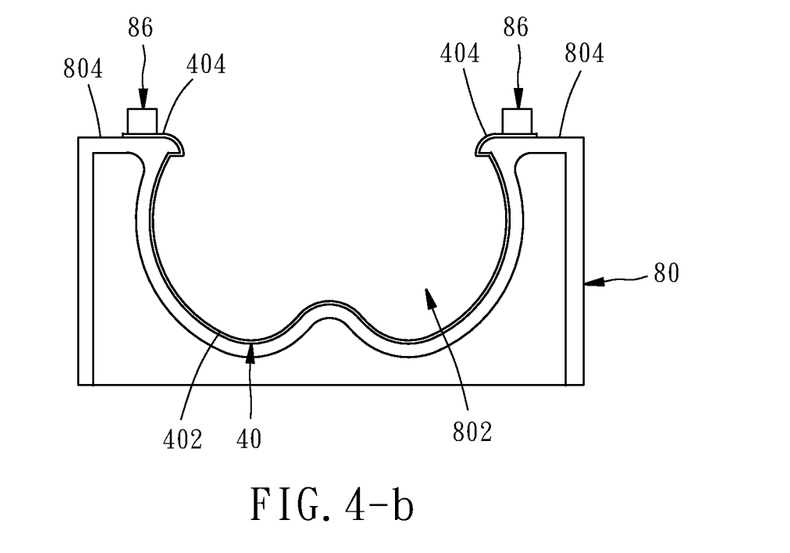
Figure 4C:
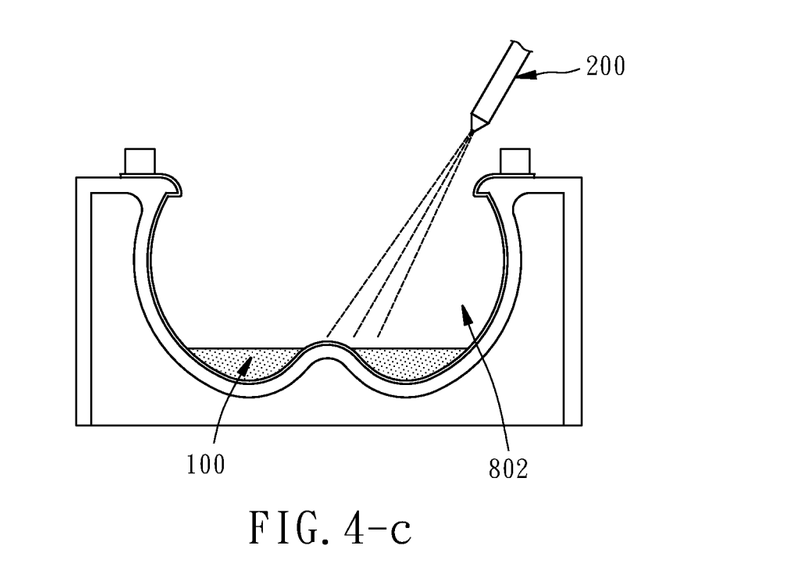
Figure 4D:
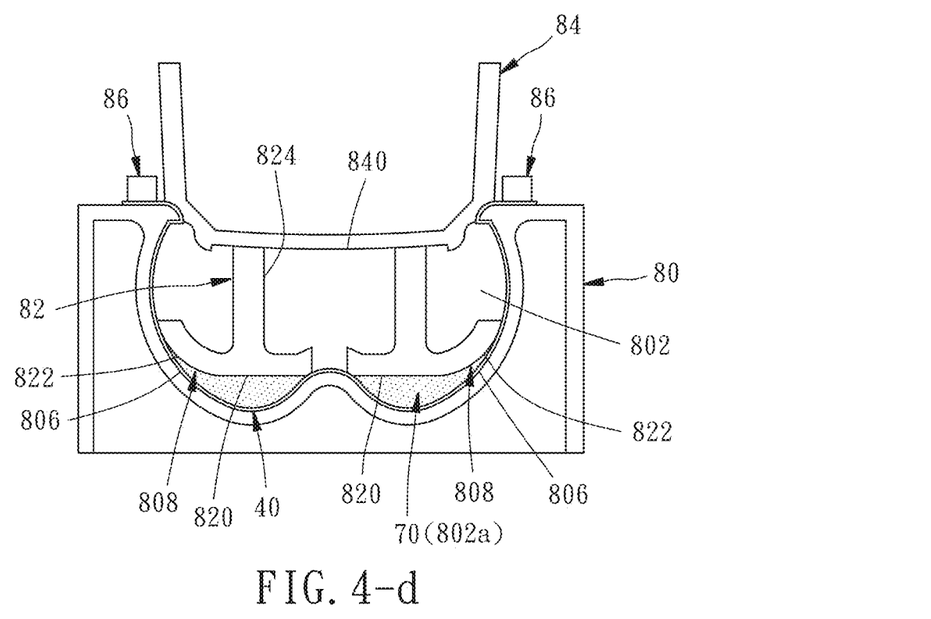
Figure 4E:
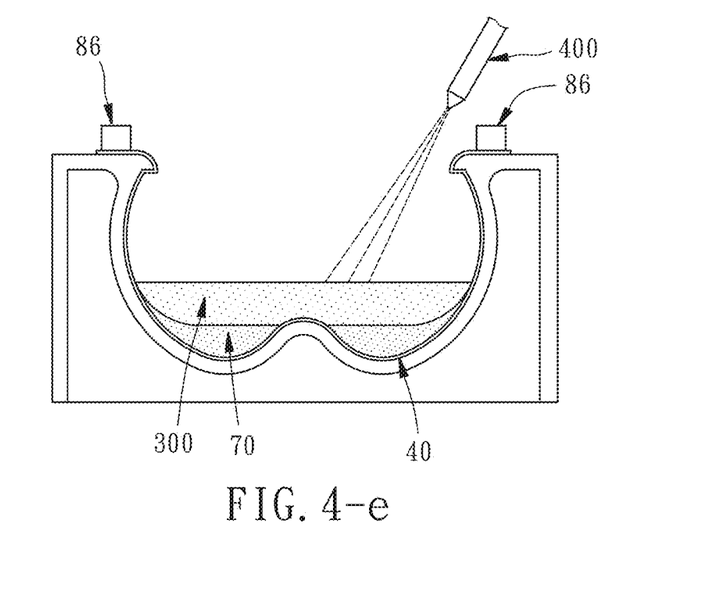
Figure 4F:
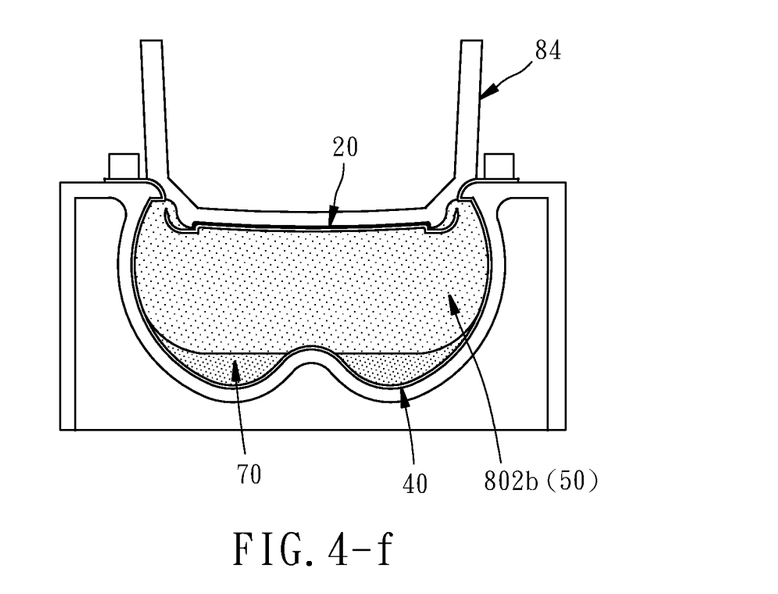
Figure 4G:
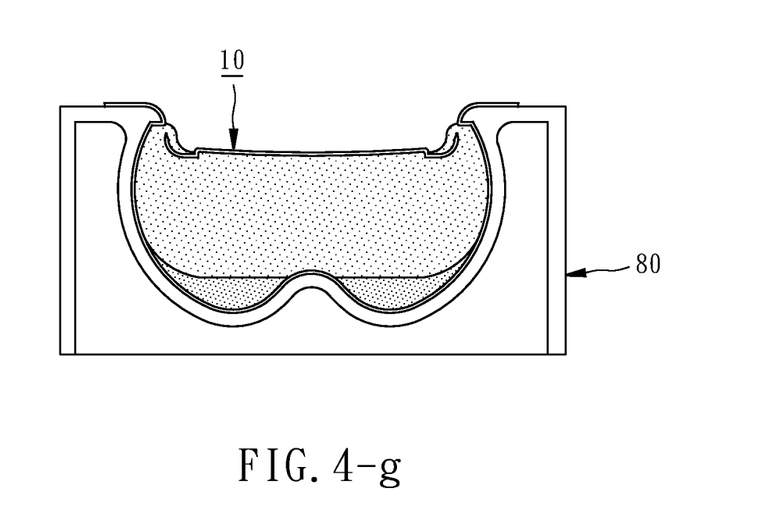

The method for making the saddle 10 includes a first step. As shown in FIG. 4-b, the female mold 80 is opened, and the cover 40 is laid on an inner wall of a mold cavity 802 of the female mold 80 by vacuum suction (not shown in the FIGS.) in a way that the cover 40 has a main area 402 being attached onto the inner wall of the mold cavity 802 and a circumferential area 404 extending to lay on an upper edge 804 of the female mold 80. And then, the locking frame 86 is pressed on the upper edge 804 of the female mold 80 with the circumferential area 404 secured therebetween to fix the cover 40 and prevent any undesired movement thereof.

In a subsequent step, as shown in FIG. 4-c, a temper foam material 100 is poured into the mold cavity 802 by a first foaming head 200 at a molding temperature in a range of about 30 degrees Celsius and about 50 degrees Celsius. Then, as shown in FIG. 4-d, the above step is followed by a step of placing the first male mold 82 into the mold cavity 802 for defining a first closed portion 802a between the main area 402 of the cover 40 and the first male mold 82 and maintaining the mold in such closed condition about 3 to 5 minutes for foaming the temper foam material 100 into the pressure-loading layer 70 according to the shape of the first closed portion 802a. In this step, preferably, the second male mold 84 is applied against the first male mold 82 to provide a biasing force. As shown in in FIG. 4-d, in this embodied method, there are two first male molds 82 and each of the first male molds 82 has an upper portion 824. The second male mold 84 abuts against the upper portion 824 of each of the first male molds 82 with its bottom surface 840 to provide a biasing force on each of the first male molds 82. In addition, the inner wall of the mold cavity 802 is designed to have a concave arc surface 806 and the first male mold 82 has a bottom surface 820 with a convex arc portion 822 corresponding to the concave arc surface 806 so that the first closed portion 802a has a meniscus edge 808 for allowing the pressure-bearing layer 70 not only has the second upper surface 702 and the second side surface 704 but has the second convex arc surface 706 connecting the second upper surface 702 and the second side surface 704, and the second under surface 708 with the concave arc portion 710.

The step of forming the pressure-bearing layer 70 is followed sequentially by a step of removing the first male mold 82 to re-open the mold cavity 802 of the female mold 80, as shown in FIG. 4-e, an ordinary foam material 300, which has a spring-back rate being higher than the temper foam material 100, is then poured into the mold cavity 802 by a second foaming head 400 at a molding temperature in a range of about 30 degrees Celsius and about 50 degrees Celsius. After this step, a step for forming the supporting layer 50 is followed, as shown in FIG. 4-f, the mold cavity 802 is re-closed by the second male mold 84 with the shell 20 coupled thereon for defining a second closed portion 802b between the shell 20 and the pressure-loading layer 70. In these conditions, the operating time may be about 4 to 6 minutes for foaming the ordinary foam material 300 into the supporting layer 50 according to the shape of the second closed portion 802b.

At last, as shown in FIG. 4-g, a final step of the method is to open the mold cavity 802 by removing the second male mold 84 and the locking frame 86 to allow extraction of the finished saddle 10.

It can be seen from the foregoing disclosures that the bicycle saddle 10 made by the method embodied according one aspect of the present invention includes the padding 30 combined by the supporting layer 50 and the pressure-bearing layer 70. The supporting layer 50 is made of a PU foam material with a high spring-back rate thus on the one hand providing a suitable elasticity of the saddle 10 and on the other hand also providing a suitable support of the saddle 10. Advantageously, the pressure-bearing layer 70 is made of a temper foam material such that when the bicycle saddle 10 is pressurized by the rider's body during riding, the pressure-bearing layer 70 is molded to conform to the contour of the rider's body; thereby the pressure on the pressure-bearing layer 70 can uniformly distribute to the entire contact surface thereof, helping relieve pressure points, preventing pressure sores, etc., and thus improving riding comfort of the rider. Furthermore, the second side surfaces 704 of the pressure-bearing layer 70 has a first lower end, and the concave arc portion 710 of the pressure-bearing layer 70 has respectively a second lower end joining to the first lower end so as to define an outer edge 712. The outer edge 712 is connected with the upper end of the first side surface 504 so that the saddle 10 will have a smooth outer side surface for providing a comfortable contact during riding.

What is claimed is:

1. A method for making a bicycle saddle, the bicycle saddle comprising a load-bearing shell, a padding disposed on the shell, and a cover covering tightly over the padding, the padding comprising a supporting layer and a pressure-bearing layer, the supporting layer including a first upper surface, a first side surface, a first convex arc surface connecting the first upper surface and the first side surface, and a first under surface attached onto the upper surface of the shell, the pressure-bearing layer including a second upper surface, a second side surface, a second convex arc surface connecting the second upper surface and the second side surface, and a second under surface with a second concave arc portion, the second upper surface, the second side surface and the second convex arc surface being tightly covered by the cover, the second under surface being bonded on the upper surface of the supporting layer, the second concave arc portion being bonded onto the first convex arc surface of the supporting layer, the second side surface of the pressure-bearing layer having a first lower end, the concave arc portion of the pressure-bearing layer having a second lower end joining to the first lower end of the second side surface to define an outer edge, the outer edge being connected with an upper end of the first side surface of the supporting layer; the method comprising the following steps:

placing a cover, which has a main area and a circumferential area extending from the main area, onto a mold cavity of a female mold by vacuum suction in a way that the main area of the cover is attached to an inner wall of the mold cavity and the circumferential area of the cover extends beyond an edge of the mold cavity;

pouring a pressure-loading layer of a temper foam material into the mold cavity and keeping the mold cavity at a molding temperature being higher than room temperature;

placing two first male molds into the mold cavity for defining a first closed portion between the main area of the cover and the two first male molds to provide a biasing force, and maintaining the two first male molds in such closed condition a first period of time for foaming the temper foam material into the pressure-loading layer according to the shape of the first closed portion;

removing the two first molds;

pouring a supporting layer of an ordinary foam material into the mold cavity;

coupling a shell made of a rigid or semi-rigid plastic material to a second male mold;

closing the mold cavity by the second male mold for defining a second closed portion between the shell and the pressure-loading layer and maintaining the second male mold in such closed condition a second period of time for foaming the ordinary foam material into the supporting layer according to the shape of the second closed portion, and removing the second male mold and extracting a finished bicycle saddle;

wherein the inner wall of the mold cavity has a concave arc surface, each of the two first male molds has a bottom surface with a convex arc portion corresponding to the concave arc surface of the mold cavity to define a meniscus edge in the first closed portion of the mold cavity for allowing the pressure-bearing layer to have the outer edge connected with the upper end of the first side surface of the supporting layer such that the finished bicycle saddle has a smooth outer side surface for providing a comfortable contact during riding, wherein each of the two first male molds has an upper portion, the second male mold has a bottom surface, and the second male mold abuts against the upper portion of each of the two first male molds with the bottom surface thereof to provide a biasing force on each of the two first male molds.

2. The method according to claim 1, wherein the molding temperature is in a range of 30 degrees Celsius and 50 degrees Celsius.

3. The method according to claim 1, wherein the first period of time is 3 to 5 minutes.

4. The method according to claim 1, wherein the second period of time is 4 to 6 minutes.

5. The method according to claim 1, wherein the ordinary foam material comprises a polyurethane foam material with a spring-back rate being higher than the temper foam material.

6. The method according to claim 1, further comprising a step of disposing a locking frame onto the edge of the mold cavity to secure the circumferential area of the cover.

* * * * *